Sept. 20, 1955 W. E. CROSS 2,718,062
PROTRACTOR STRUCTURE
Filed May 6, 1952
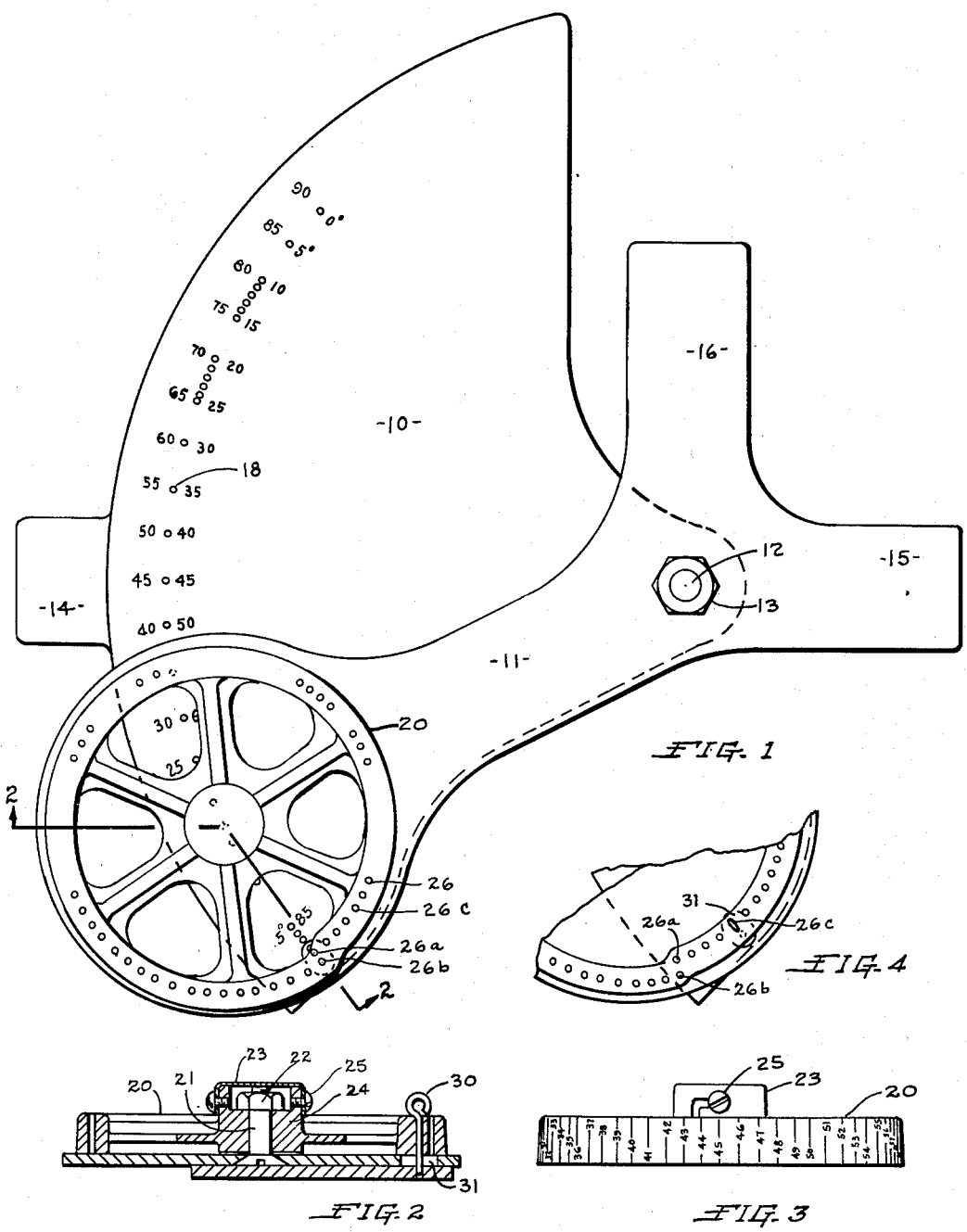
WITNESS
INVENTOR.
William E. Cross
BY D. Emmett Thompson
Attorney

United States Patent Office 2,718,062
Patented Sept. 20, 1955

2,718,062
PROTRACTOR STRUCTURE
William E. Cross, Seneca Falls, N. Y.

Application May 6, 1952, Serial No. 286,358

3 Claims. (Cl. 33—75)

This invention relates to protractor structures and has for an object a protractor embodying a structure by which the head and arm members, or comparable members carrying the straight edges, can be quickly and conveniently adjusted to angles of one minute variation.

The invention consists in the novel features and in the combinations and constructions hereinafter set forth and claimed.

In describing this invention, reference is had to the accompanying drawing in which like characters designate corresponding parts in all the views.

In the drawings—

Figure 1 is a top plan view of a protractor structure embodying my invention.

Figure 2 is a view taken on line 2—2, Figure 1.

Figure 3 is a side elevational view of the movable member carried by the arm.

Figure 4 is an enlarged, fragmentary view, showing in detail the relationship between the head, arm and movable member.

The device consists of a head member 10 and an arm 11 pivotally mounted on the head 10, as by means of a bolt 12, the assembly being held together by a nut 13. The head 10 and the arm 11 are preferably formed of sheet metal, the head being formed with a projection 14, and the arm with projections 15, 16. Suitable straight edges may be attached to the projections 14, 15, 16, or the projection 14 may be attached to the supporting member of a drafting machine, and scales may be attached to the projections 15, 16, which are arranged in right angular formation.

The head 10 is provided with an arcuate series of small apertures 18 extending concentrically with the pivot 12. The apertures 18 are spaced at intervals of one degree, and the head 10 may be provided with indicia to give the degree designation at uniform intervals, as shown in Figure 1.

A movable member is mounted upon the arm 11 and is also provided with a series of apertures which are successively brought into alined registration with a selected one of the apertures 18. As illustrated, the movable member is preferably in the form of a disk or wheel 20 journalled on a stud 21 carried by the arm 11, the disk being retained on the stud by a nut 22 enclosed by a cap 23 detachably secured to the upper end of the hub 24 of the disk, as by screws 25. The disk 20 is formed with a circular series of apertures 26 extending parallel to its pivotal axis. The series of apertures 26 extend eccentrically, or in a spiral arrangement, relative to the axis of the disk, the distance, or spacing, of each successive one of the apertures 26 from the axis of the disk being sufficient to effect movement of the arm 11 through an angle of one minute, as the apertures 26 are successively moved into alined registration with the selected one of the apertures 18.

Referring to Figure 1, the radial spacing between the apertures 26ª, 26ᵇ, is equivalent to the movement of the arm 11 59 minutes. The arm 11 is fixedly interlocked to the head 10 by a holding pin 30 adapted to be inserted through one of the apertures 26 and a selected one of the apertures 18. The arm is provided with an elongated slot 31 in registration with the arcuate series of apertures 18 to permit insertion of the pin.

In Figure 2, the pin is shown inserted through the aperture 26ª in the disk 20, and the lowermost aperture 18, Figure 1, in the arm 10. With this setting, the protractor is set at 0—that is, the projection 15 is arranged parallel to the projection 14, and the projection 16 is arranged perpendicular to the projection 14. If the withholding pin 30 is removed and the disk rotated in a clockwise direction Figure 1, to bring the aperture 26ᶜ in registration with the lowermost aperture 18 in the head 10 and the pin reinserted in these alined apertures, the protractor will be set at an angle of four minutes. If instead of the lowermost hole of the series 18, the hole is selected at the designation 40° and the disk was in the positon shown in Figure 4, the angle would be 40° and 4 minutes. Or, on the other hand, taking the setting shown in Figure 1, if the withholding pin 30 was withdrawn and the arm 11 was moved upwardly about its pivot to bring the hole 26ᵇ in registration with the lowermost hole 18, the setting would be 59 minutes.

With this arrangement, it will be apparent that the arm 11 can be quickly and conveniently adjusted about its pivot relative to the head 10 and an accuracy of setting obtained within one minute.

What I claim is:

1. A protractor structure comprising a head, an arm pivotally mounted on said head, said head being formed with an arcuate series of apertures spaced at one degree intervals and extending concentrically in spaced relation to said pivot, a member mounted on the arm and being formed with a series of apertures, said member being movable relative to the arm to successively aline the apertures therein with a selected one of the apertures in the head, a holding pin for insertion in said alined apertures, each aperture of the series in said movable member being arranged relative to the adjacent aperture to effect movement of the arm about its pivot one minute of angle upon successive movement of said apertures in said movable member in registration with said selected aperture in the head.

2. A protractor structure comprising a head, an arm pivotally mounted on the head, said head being formed with an arcuate series of apertures spaced at one degree intervals and extending concentrically of said pivot, a member movably mounted on the arm and being formed with a series of apertures adapted upon movement of said member to be successively alined in registration with a selected one of the apertures in the head, a pin for insertion in said alined apertures, the apertures in said series in the movable member being arranged upon such successive alinement to effect successive movements of the arm about its pivot relatively to the head in one minute intervals.

3. A protractor structure comprising a head, an arm pivotally mounted on the head, said head being formed with an arcuate series of apertures spaced at one degree intervals and extending concentrically of said pivot, a disk journalled on the arm, said disk being formed with a spiral series of apertures, said apertures in the disk being successively movable into alined registration with a selected one of the apertures in the head upon rotation of the disk, and said apertures in the disk being arranged upon such successive movement to effect movement of the arm about its pivot in one minute intervals, and a holding pin for insertion in the alined apertures.

References Cited in the file of this patent
UNITED STATES PATENTS

| | | |
|---|---|---|
| 483,499 | McChesney | Sept. 27, 1892 |
| 1,229,069 | Hagman | June 5, 1917 |
| 1,329,005 | Neumaier | Jan. 27, 1920 |
| 1,864,341 | Davie | June 21, 1932 |
| 2,508,837 | Peffers | May 23, 1950 |
| 2,594,574 | Marsden | Apr. 29, 1952 |